(12) United States Patent
Rule et al.

(10) Patent No.: US 10,075,576 B1
(45) Date of Patent: Sep. 11, 2018

(54) STARTING A MACHINE THROUGH A MOBILE DEVICE

(71) Applicant: Caterpillar Inc., Peoria, IL (US)

(72) Inventors: Jeffrey David Rule, Peoria, IL (US); Kirk Shively, Dunlap, IL (US); Derek J. Light, Washington, IL (US); Joshua Dean Reed, Galesburg, IL (US); Bradley Bergerhouse, Peoria, IL (US); Arjun Veneshetty, Dunlap, IL (US); Sudhakar Subramaniyan, Dunlap, IL (US); Rohinikumar Adivi, Peoria, IL (US); Harold Duane Dabbs, Peoria, IL (US); Paul William Bierdeman, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/654,818

(22) Filed: Jul. 20, 2017

(51) Int. Cl.
| H04M 1/725 | (2006.01) |
| H04W 12/08 | (2009.01) |
| H04L 29/08 | (2006.01) |
| H04W 12/04 | (2009.01) |

(52) U.S. Cl.
CPC ...... *H04M 1/72527* (2013.01); *H04L 67/025* (2013.01); *H04W 12/04* (2013.01); *H04W 12/08* (2013.01)

(58) Field of Classification Search
CPC . H04M 1/72527; H04W 12/04; H04W 12/08; H04L 67/025
See application file for complete search history.

(56) References Cited

U.S. PATENT DOCUMENTS

| 8,566,203 | B1 | 10/2013 | Vieira et al. |
| 9,008,917 | B2 | 4/2015 | Gautama et al. |
| 9,165,127 | B2 | 10/2015 | Keisuke et al. |
| 9,305,412 | B2 | 4/2016 | Winkelman |
| 9,544,768 | B2 | 1/2017 | Steffey et al. |
| 2006/0143463 | A1* | 6/2006 | Ikeda ............ B60R 25/04 713/182 |
| 2007/0040649 | A1* | 2/2007 | Dulgerian ........ B60R 25/24 340/5.64 |

(Continued)

FOREIGN PATENT DOCUMENTS

DE     102012022786     5/2014

*Primary Examiner* — Lewis West
(74) *Attorney, Agent, or Firm* — Edward Y. Lin

(57) ABSTRACT

A system and method to access a machine through a mobile device includes sending a machine key to a controller on-board the machine, and a mobile device key to the mobile device using a remote server. The mobile device sends a mobile device ID to the controller. The controller determines the mobile device key based on the mobile device ID and the machine key. The controller sends a random number to the mobile device. The mobile device processes the random number to derive a first processed random number, and sends the first processed random number to the controller. The controller processes the random number to derive a second processed random number. The controller enables a start button to send a request to start the machine, when the first processed random number matches the second processed random number. The controller starts the machine upon receiving the request to start the machine.

20 Claims, 17 Drawing Sheets

(56) References Cited

U.S. PATENT DOCUMENTS

| | | | | |
|---|---|---|---|---|
| 2007/0200671 A1* | 8/2007 | Kelley | .................. | B60R 25/257 340/5.72 |
| 2009/0292528 A1* | 11/2009 | Kameyama | .......... | G08G 1/0962 704/9 |
| 2010/0171642 A1* | 7/2010 | Hassan | .................. | G01C 17/38 340/992 |
| 2010/0305779 A1* | 12/2010 | Hassan | .................. | G01C 17/38 701/2 |
| 2011/0197844 A1* | 8/2011 | Matsubara | .............. | B60R 25/00 123/179.2 |
| 2015/0005984 A1* | 1/2015 | De Los Santos | ..... | H04L 67/125 701/2 |
| 2015/0045013 A1* | 2/2015 | Simmons | .............. | H04W 4/008 455/420 |
| 2015/0073685 A1* | 3/2015 | Choi | .................. | F02N 11/0807 701/113 |
| 2016/0150407 A1* | 5/2016 | Michaud | ............... | H04W 12/06 726/6 |
| 2016/0321566 A1* | 11/2016 | Liu | ........................ | G06Q 10/02 |
| 2016/0344747 A1* | 11/2016 | Link, II | ................ | H04L 63/123 |
| 2016/0358389 A1 | 12/2016 | Menard et al. | | |
| 2017/0060559 A1* | 3/2017 | Ye | ............................. | G06F 8/65 |
| 2017/0267214 A1* | 9/2017 | Penilla | ................ | B60R 25/2018 |

\* cited by examiner

STARTING A MACHINE THROUGH A MOBILE DEVICE

TECHNICAL FIELD

The present disclosure relates to remotely starting a machine. More particularly, the present disclosure relates to remotely starting a machine through a mobile device.

BACKGROUND

As technology has advanced in the field of mobile devices and communication systems, various applications of mobile devices have found their way into vehicles. Particularly, remote starting of vehicles through mobile devices provides a convenient means to access the vehicle without using a physical key. A more specific example can be considered of a worksite where multiple operators work with multiple machines. The operators, as per requirements on the worksite, are allowed to access the machines for which they are authorized through mobile devices.

Various systems and methods are known in the art which facilitate such a system to allow the operator to access the machine through the mobile device. However, it is of prime importance for the worksite to function efficiently, that the operators get access to only the machines for which they are authorized. Conventional systems typically make use of one-time-passwords, static passwords and many other such algorithms.

One such example is provided by the U.S. Pat. No. 9,165,127 (hereinafter referred to as the '127 reference). The '127 reference discloses a working machine provided with a control device that can make wireless communication with a mobile terminal storing a mobile-use identification (ID) code and stores a working machine-use ID code. The control device is provided with ID code checking means to check the mobile-use ID code obtained by ID code obtaining means and the working machine-use ID code with each other. Data communication between the mobile terminal and the control device is allowed once the matching between the ID codes is established. However, the ID codes are fixed and once an operator knows the codes, he/she can always have access to the machine even if the authorization is revoked or changed.

SUMMARY

In an aspect of the present disclosure, a method to access a machine through a mobile device is provided. The method includes sending a machine key to a controller on-board the machine using a remote server. The remote server is located at an off-board location relative to the machine. The method includes sending a mobile device key to the mobile device using the remote server. The method includes sending a mobile device ID associated with the mobile device to the controller using the mobile device. The method includes determining the mobile device key based at least on the mobile device ID and the machine key through the controller. The method includes sending a random number to the mobile device using the controller. The method includes processing the random number based on the mobile device key to derive a first processed random number through the mobile device. The method includes sending the first processed random number to the controller using the mobile device. The method includes processing the random number based on the determined mobile device key to derive a second processed random number through the controller. The method includes comparing the first processed random number and the second processed random number through the controller. The method includes enabling a start button for sending a request to start the machine, when the first processed random number matches the second processed random number. The method further includes starting the machine upon receiving the request to start the machine through the use of the start button.

In another aspect of the present disclosure, a control system to access a machine is provided. The control system includes a remote server located at an off-board location relative to the machine. The remote server generates a mobile device ID, a mobile device key and a machine key. The control system includes a mobile device having an associated mobile device ID and a mobile device key. The mobile device receives the mobile device ID and the mobile device key from the remote server. The control system further includes a controller on-board the machine. The controller receives the mobile device ID from the mobile device. The controller receives the machine key from the remote server. The controller determines the mobile device key based on the mobile device ID and the machine key. The controller sends a random number to the mobile device. The controller receives a first processed random number from the mobile device. The mobile device determines the first processed random number based on the mobile device key. The controller processes the random number based on the determined mobile device key to determine a second processed random number. The controller compares the first processed random number with the second processed random number. The controller enables a start button for sending a request to start the machine, when the first processed random number matches the second processed random number. Furthermore, the controller starts the machine upon receiving the request to start the machine through the use of the start button.

In yet another aspect of the present disclosure, a machine including a controller on-board the machine is provided. The controller receives a mobile device ID from a mobile device. The controller receives a machine key from a remote server. The controller determines a mobile device key based on the mobile device ID and the machine key. The controller sends a random number to the mobile device. The controller receives a first processed random number from the mobile device. The mobile device determines the first processed random number based on the mobile device key received from the remote server. The controller processes the random number based on the determined mobile device key to determine a second processed random number. The controller compares the first processed random number with the second processed random number. The controller enables a start button for sending a request to start the machine, when the first processed random number matches the second processed random number. Furthermore, the controller starts the machine upon receiving the request to start the machine through the use of the start button.

DETAILED DESCRIPTION

Figure 1:
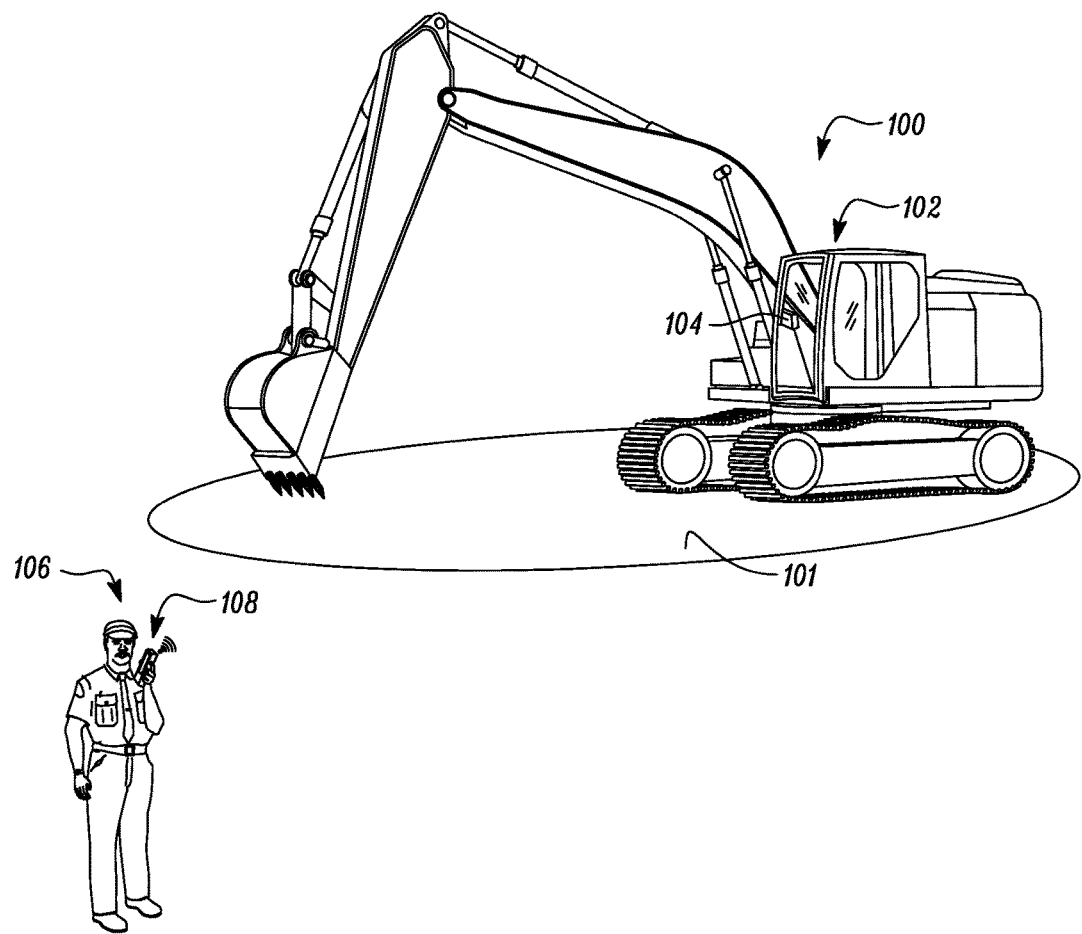
FIG. 1 shows an exemplary worksite showing an exemplary machine and an operator carrying a mobile device, according to an aspect of the present disclosure.

Wherever possible, the same reference numbers will be used throughout the drawings to refer to the same or like parts. FIG. 1 shows an exemplary machine 100 at a worksite 101 at which one or more machines 100 may be operating to perform various tasks. Although, the machine 100 is illustrated as a hydraulic excavator, the machine 100 may be any other type of a work machine as well which may perform a repetitive work cycle of operations associated with industries such as mining, construction, farming, transportation, landscaping, or the like. Examples of such machines may include wheel loaders, hydraulic shovels, dozers, dump trucks etc. While the following detailed description describes an exemplary aspect in connection with the hydraulic excavator, it should be appreciated that the description applies equally to the use of the present disclosure in other machines as well.

The machine 100 includes an operator station 102 to accommodate an operator 106 for operating the machine 100 to perform various tasks. The operator station 102 includes various controls and input means through which the operator 106 may provide inputs to control the machine 100. The machine 100 includes an on-board controller 104 which may control various operational parameters of the machine 100. The controller 104 may be communicably coupled to various systems of the machine 100 such as an ignition system, a propulsion system, etc. The controller 104 may control various functions of the machine 100 to operate the machine 100 in a desired manner. The controller 104 may also be configured to communicate with devices or systems which may not be a part of the machine 100 through various communication medium such as Bluetooth®, Wi-Fi®, internet connectivity, cellular networks, Near Field Communication (NFC), wireless communication systems, etc.

FIG. 1 shows the operator 106 standing on the worksite 101. The operator 106 is illustrated as carrying a mobile device 108 in his hand. The operator 106 may carry the mobile device 108 in his pocket or may hold the mobile device 108 in his hand while working on the worksite 101. The mobile device 108 may be a smart phone, a tablet, or any other such device which may be suitable for application in various aspects of the present disclosure. The mobile device 108 may be configured to send/receive messages to other devices via Bluetooth®, Wi-Fi®, internet connectivity, cellular networks, NFC, wireless communication systems, etc. The operator 106 may use the mobile device 108 to start the machine 100 without requirement of any physical key. The operator 106 may also use the mobile device 108 to start the machine 100 without being physically present on the machine 100. The operator 106 may be outside the operator station 102, or near the machine 100, or the operator 106 may also be at a remote back-office.

Although, the illustrated embodiment shows only one operator 106 on the worksite 101, there may be any number of operators 106 on the worksite 101 which may carry respective mobile devices 108. The mobile device 108 may have a mobile application installed, which may allow the mobile device 108 to start the machine 100 based on appropriate authentication procedures being followed. The authentication procedures will be described in detail in the forthcoming description. The mobile application may store a list of machines 100 which the operator 106 carrying the mobile device 108 may be authorized to operate. The operator 106 may run the mobile application on the mobile device 108 and select the machine 100 which the operator 106 wishes to operate.

Figure 2:
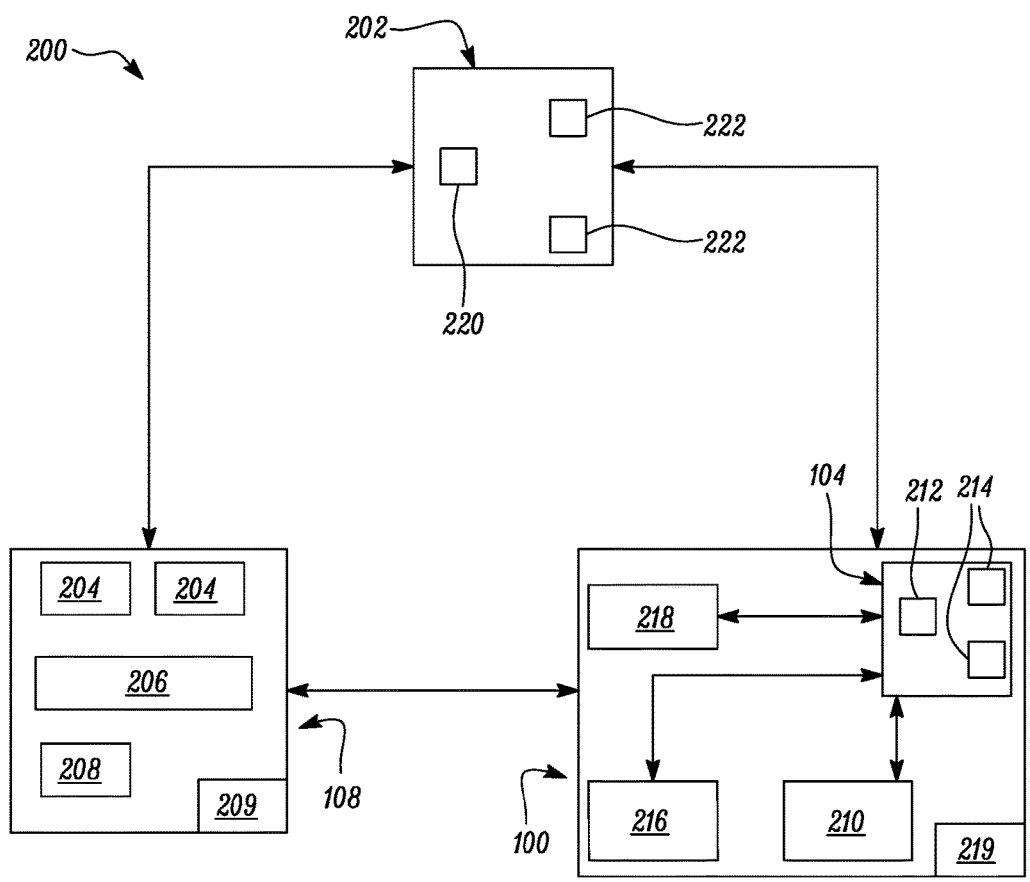
FIG. 2 schematically shows a control system for starting the machine through the mobile device, according to an aspect of the present disclosure.

FIG. 2 schematically illustrates a control system 200 to start the machine 100 through the mobile device 108. The control system 200 includes the mobile device 108, the controller 104 and a remote server 202. Furthermore, the mobile device 108 includes one or more transceivers 204 to communicate with other devices and systems. The transceiver 204 may send/receive messages or data through any suitable communication medium including one or more of Bluetooth®, Wi-Fi®, internet connectivity, cellular networks, NFC, wireless communication systems, etc. Although, two transceivers 204 are illustrated, there may be any number of transceivers 204 provided on the mobile device 108. The mobile device 108 includes a processor 206 to perform various calculations and to process data which may be required for authentication procedures.

The mobile device 108 also includes a user interface 208 for enabling the operator 106 to operate the mobile device 108. The user interface 208 may be a touch screen, a keypad, or any other such kind of a user interface which may allow the operator 106 to provide desired inputs to the processor 206 of the mobile device 108. In an embodiment, the user interface 208 is a touch screen through which the operator 106 may provide inputs to the mobile device 108. The mobile device 108 has an associated mobile device ID 209. The mobile device ID 209 may be a unique identification code which may be used to identify the mobile device 108. In an embodiment, the mobile device ID 209 is a Universal Unique Identifier (UUID). In another embodiment, the mobile device ID 209 is an International Mobile Equipment Identity (IMEI) number of the mobile device 108.

The controller 104 has an associated memory 210 to store various operational parameters as well as other relevant information. The controller 104 includes a processor 212 to perform various tasks and calculations required as per various aspects of the present disclosure. The controller 104 also includes one or more transceivers 214 which may send and receive signals to communicate with other components of the control system 200 such as the mobile device 108 and the remote server 202. In an embodiment, the transceivers 214 may send/receive messages or data through any suitable communication medium including Bluetooth®, Wi-Fi®, internet connectivity, cellular networks, NFC, wireless communication systems, etc. It should be contemplated that although the FIG. 2 shows that the controller 104 includes two transceivers 214, the controller 104 may have any suitable number of transceivers 214 which may suit the need of the present disclosure.

The controller 104 is coupled to an interface 216 such as a graphical user interface of the machine 100 so that the operator 106 may provide inputs for operating the machine 100. The interface 216 may be a touch screen, a keypad, a joystick or any other such kind of a user interface which may allow the operator 106 to provide desired inputs to the machine 100. In an embodiment, the interface 216 may include a start button through which the operator 106 may send a request to the controller 104 to start the machine 100. The controller 104 is also coupled to an engine 218 of the machine 100.

The machine 100 may be represented by an associated machine ID 219. The machine ID 219 may be any unique identifier which may be used to refer to or identify the machine 100. The machine ID 219 may be a unique serial number which may be assigned to the machine 100. In an embodiment, the machine ID 219 may be a chassis number or a Vehicle Identification Number (VIN) which may be used to uniquely identify the machine 100. The machine ID 219 may be generated during or post manufacturing of the machine 100.

The remote server 202 is located at an off-board location relative to the machine 100. The remote server 202 may be a back-office, a control room, or any other such type of location which may be used to remotely monitor and control the machine 100. The remote server 202 includes a processor 220 to perform various tasks. The remote server 202 also includes one or more transceivers 222 to communicate with other devices and systems. The remote server 202 is communicably coupled to the controller 104 and the mobile device 108. The controller 104 and the mobile device 108 are communicably coupled to each other as well. The remote server 202, the controller 104, and the mobile device 108 may communicate to each other via Bluetooth®, Wi-Fi®, internet connectivity, cellular networks, NFC, wireless communication systems, etc.

Figure 3:
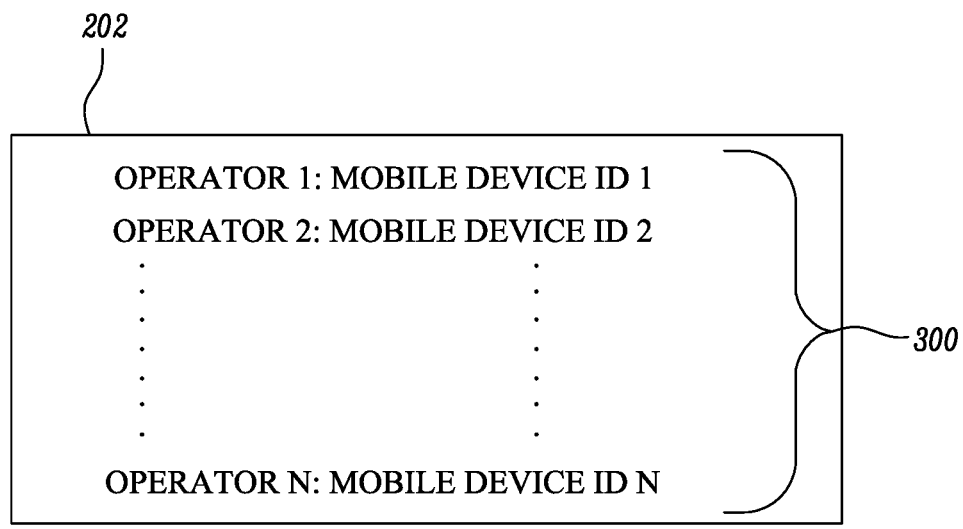
FIG. 3 shows the remote server storing a list of operators and corresponding mobile device IDs, according to an aspect of the present disclosure.

The remote server 202 may store information about the operators 106 and the machines 100 working on the worksite 101. Each operator 106 carries the corresponding mobile device 108. The remote server 202 stores a list 300 of the operators 106 and the corresponding mobile device IDs 209 as shown in FIG. 3. In an embodiment, when the operator 106 is registered with the mobile device 108, the remote server 202 may store information about the operator 106 and link the mobile device ID 209 of the respective mobile device 108 to the operator 106. In an embodiment, the controller 104 may also store the list 300 of authorized operators 106 allowed to operate the machine 100. In another exemplary embodiment, the remote server 202 may send the list 300 of the operators 106 to the controller 104.

Figure 4:
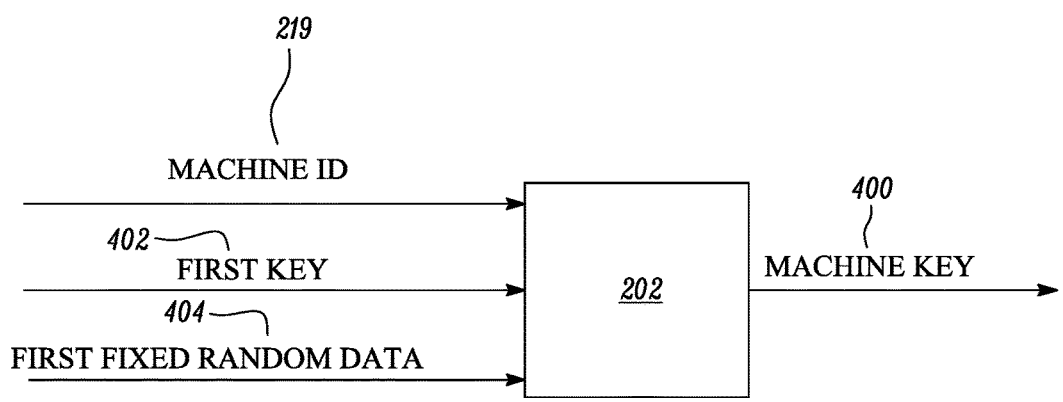
FIG. 4 shows a machine key being determined by the remote server based on various inputs, according to an aspect of the present disclosure.

Furthermore, the remote server 202 derives and stores a machine key 400 associated with each of the machines 100 operating on the worksite 101. The machine key 400 may be an encryption key which may be used to encrypt or decrypt any information which needs to be shared by the machine 100 or which is shared with the machine 100. FIG. 4 illustrates various components of the machine key 400. The remote server 202 may derive the machine key 400 from the machine ID 219, a first key 402, and a first fixed random data 404. The first key 402 may be a confidential serial number or an alpha numeric code or any other such set of characters which may be suitable for use in various aspects of the present disclosure. The remote server 202 may generate the first key 402, or a person who may be authorized to access information about all the machines 100 and the operators 106 may set the first key 402. The first fixed random data 404 may be a random data generated by any conventional random data generation algorithms already known in the art. The remote server 202 may include any such algorithm which may generate the first fixed random data 404.

Figure 5:
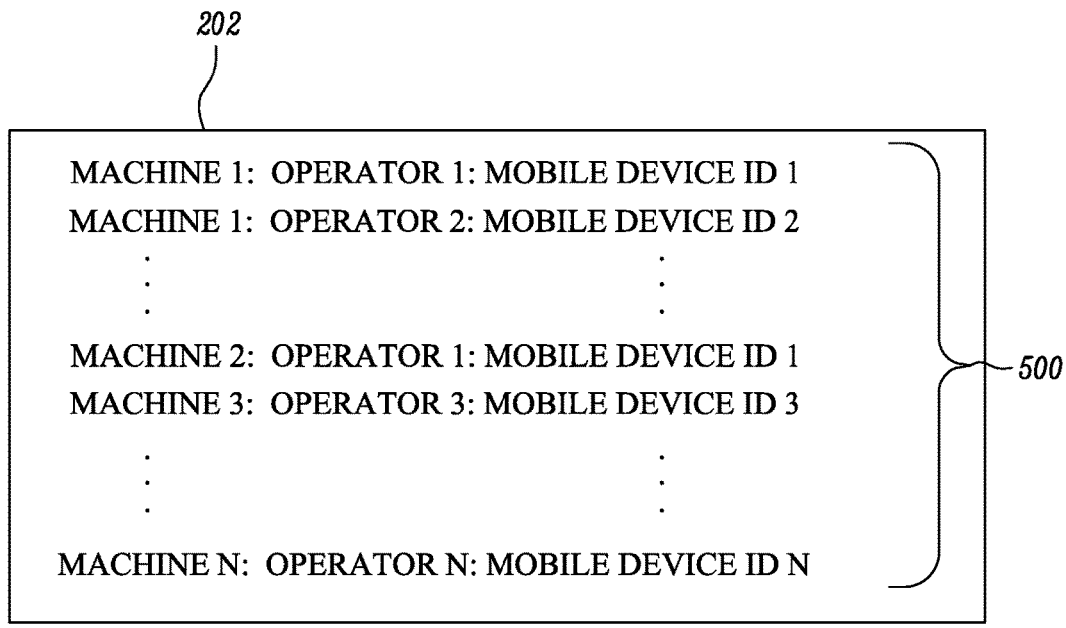
FIG. 5 shows a list of machines and corresponding operators authorized to operate the machine, according to an aspect of the present disclosure.
Figure 6:
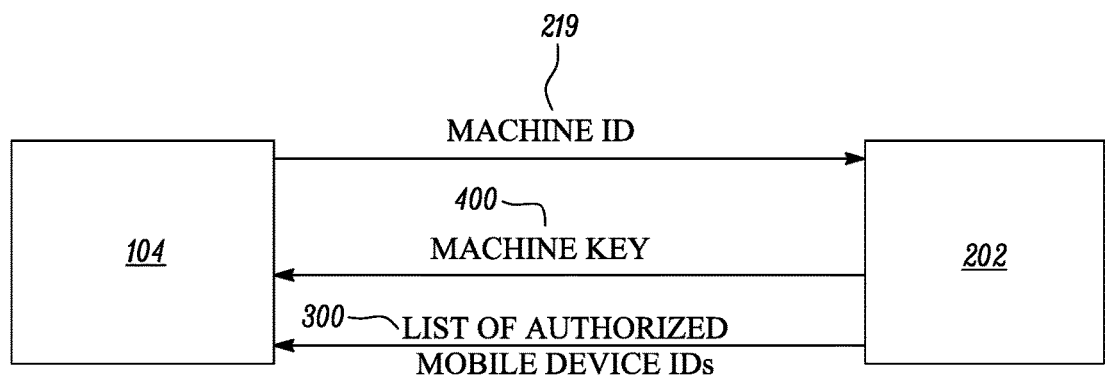
FIG. 6 shows communication between a controller and the remote server, according to an aspect of the present disclosure.

FIG. 5 shows the remote server 202 stores a list 500 of the operators 106 authorized to operate each of the machines 100. The list 500 includes the operators 106 along with the corresponding mobile device IDs 209 which may be authorized to operate the machine 100 for each of the machines 100. FIG. 6 illustrates sequence of exchange of information between the remote server 202 and the controller 104 when the remote server 202 shares the machine key 400 with the controller 104. In the illustrated embodiment, the controller 104 sends a request to the remote server 202 to send the machine key 400 to the controller 104. The controller 104 sends the machine ID 219 so that the remote server 202 may appropriately identify the machine 100, and send the machine key 400 corresponding to the machine 100 from which the controller 104 has sent the request. In response to the request by the controller 104, the remote server 202 sends the machine key 400 to the controller 104.

The remote server 202 also sends the list 300 of authorized mobile device IDs 209 to the controller 104. In an embodiment, the remote server 202 may be a website. The controller 104 may be configured to periodically check the remote server 202 for machine key 400 files for the machine 100. In case there is a new machine key 400 available for the machine 100, the controller 104 may download the new machine key 400 by providing the machine ID 219 as credentials on the website to authenticate the download process.

Figure 7:
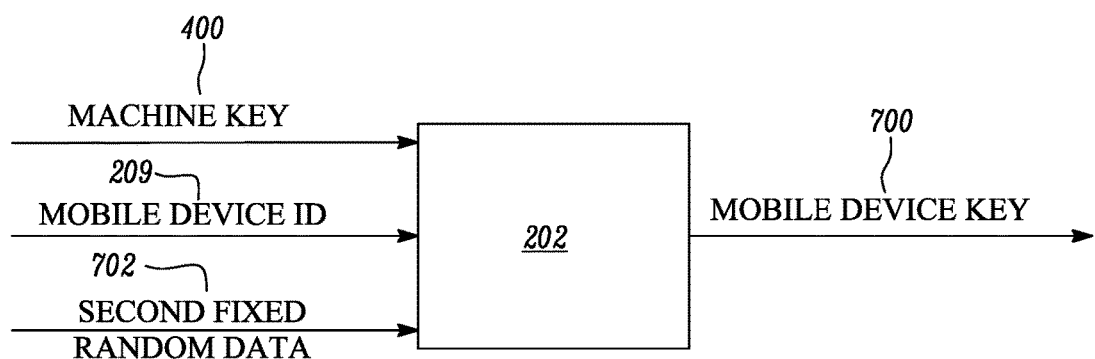
FIG. 7 shows a mobile device key being determined by the remote server based on various inputs, according to an aspect of the present disclosure.

Furthermore, the remote server 202 derives and stores a mobile device key 700. The mobile device key 700 may be an encryption key which may be used to encrypt or decrypt any information which needs to be shared by the mobile device 108 or which is shared with the mobile device 108. FIG. 7 illustrates various components of the mobile device key 700. The remote server 202 may derive the mobile device key 700 from the machine key 400, the mobile device ID 209, and a second fixed random data 702. Any conventional random data generation algorithms already known in the art may be used to generate the second fixed random data 702. The remote server 202 may include any such algorithm which may generate the second fixed random data 702.

Figure 8:
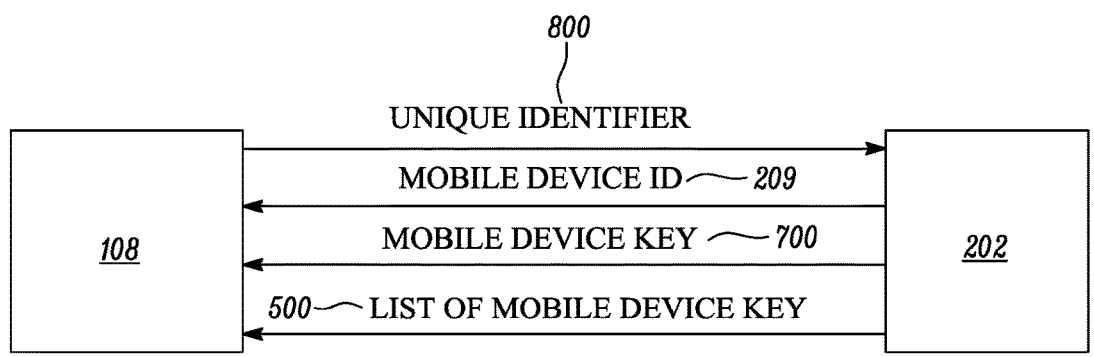
FIG. 8 shows communication between a mobile device and the remote server, according to an aspect of the present disclosure.

FIG. 8 illustrates sequence of exchange of information between the mobile device 108 and the remote server 202, when the remote server 202 shares the mobile device key 700 with the mobile device 108. The mobile device 108 sends a request to the remote server 202 to send the mobile device key 700 to the mobile device 108. The mobile device 108 sends a unique identifier 800 which may be unique to the mobile application installation so that the remote server 202 may appropriately identify the mobile device 108, and send back the mobile device ID 209 corresponding to the mobile device 108 which has sent the request. In an embodiment, the remote server 202 may also send a list 500 of mobile device keys 700 along with corresponding machine IDs 219 for a given mobile device ID 209. In another exemplary embodiment, the remote server 202 may be a website, or a web address. The mobile device 108 may access the website and download the mobile device key 700 from the website. The mobile device 108 may access the remote server 202 through a user login process, and then the mobile device 108 may send the unique identifier 800 to the remote server 202, and the remote server 202 sends back the mobile device ID 209 to the mobile device 108.

Figure 9:
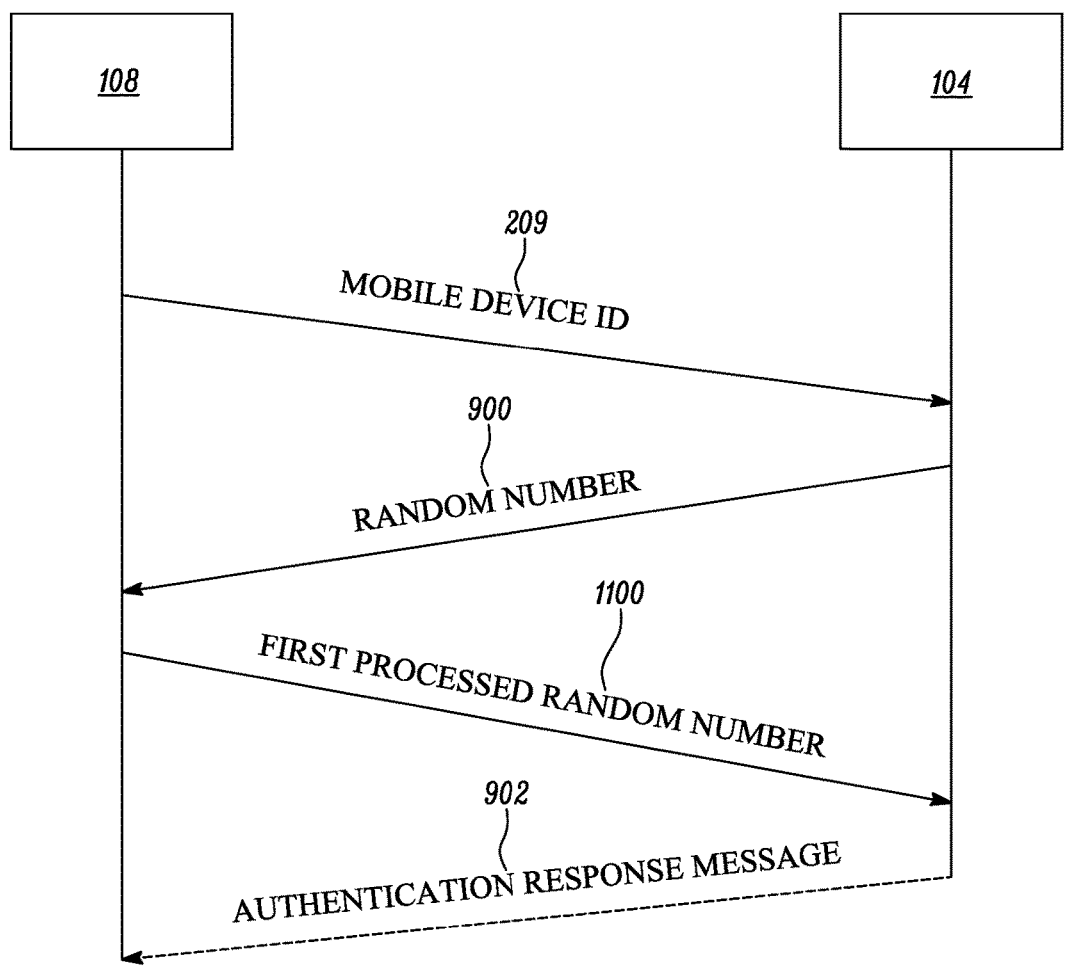
FIG. 9 shows communication between the mobile device and the controller, according to an aspect of the present disclosure.
Figure 10:
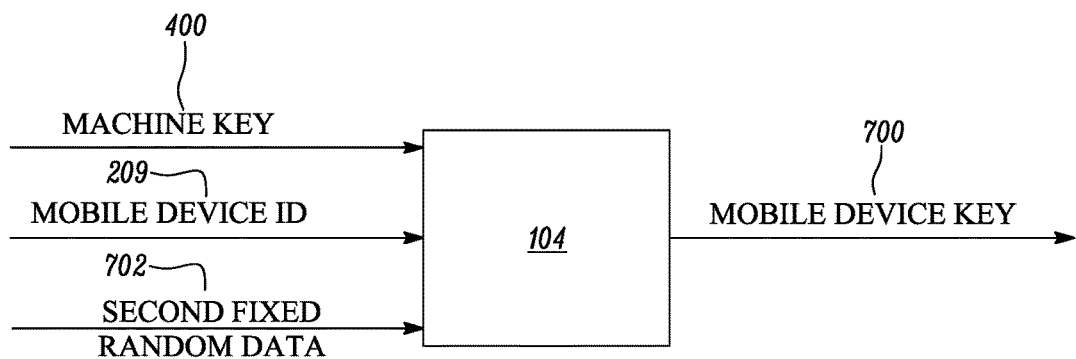
FIG. 10 shows the mobile device key being determined by the controller based on various inputs, according to an aspect of the present disclosure.

FIG. 9 schematically represents the sequence of communication occurring between the mobile device 108 and the controller 104 to authenticate the mobile device 108 for starting the machine 100. When the operator 106 carrying the mobile device 108 enters the worksite 101, the mobile device 108 sends the mobile device ID 209 to the controller 104. In an embodiment, the mobile device 108 sends the mobile device ID 209 to the controller 104 when the operator 106 is less than a pre-determined distance away from the machine 100. The controller 104 receives the mobile device ID 209 through the transceiver 214. The controller 104 then determines the mobile device key 700 by using the received mobile device ID 209 as shown in FIG. 10. The controller 104 determines the mobile device key 700 from the mobile device ID 209, the machine key 400, and the second fixed random data 702. The controller 104 may receive the second fixed random data 702 from the remote server 202. The second fixed random data 702 is a fixed random data value which may be generated through any random data generation algorithm known in the art.

With continued reference to FIG. 9, the controller 104 sends a random number 900 to the mobile device 108. In an embodiment, the controller 104 may match the mobile device ID 209 with the list 300 of the mobile device IDs 209 stored in the memory 210 of the controller 104. The list 300 includes one or more pre-stored mobile device IDs 209 in the memory 210 of the controller 104. The controller 104 checks if the mobile device ID 209 matches any one of the pre-stored mobile device IDs 209. When the mobile device ID 209 does not match any of the pre-stored mobile device IDs 209, the controller 104 blocks the mobile device 108 from communicating with the controller 104 for a pre-determined time period. In an embodiment, the pre-determined time period may be one minute. The pre-determined time period may be adjustable based on response frequency of the mobile device 108 and the controller 104. No further processing is done when the mobile device ID 209 does not match any of the pre-stored mobile device IDs 209.

When the mobile device ID 209 matches from any one of the pre-stored mobile device IDs 209 from the list 300, the controller 104 sends the random number 900 to the mobile device 108. The controller 104 may also temporarily store the random number 900 in the memory 210. The random number 900 may be generated by any random data generation algorithm known in the art which may be suitable for the application in various aspects of the present disclosure. In an embodiment, the random number 900 may also be an alphanumeric code, a sequence of letters or any other such random sequence of characters.

Figure 11:
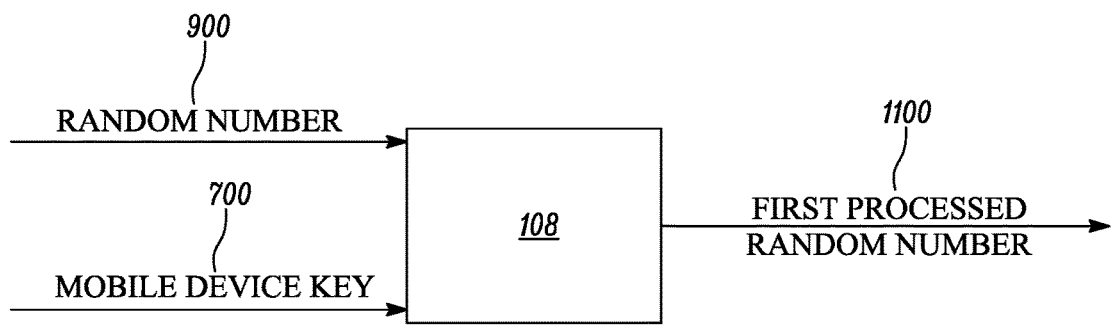
FIG. 11 shows a first processed random number being determined by the mobile device based on various inputs, according to an aspect of the present disclosure.

The mobile device 108 receives the random number 900 from the controller 104 and processes the random number 900 as shown in FIG. 11. The mobile device 108 makes use of the mobile device key 700 to process the random number 900 and derives a first processed random number (FPRN) 1100. The FPRN 1100 is an outcome of the mobile device key 700 being used to encrypt the random number 900 by the mobile device 108.

Figure 12:
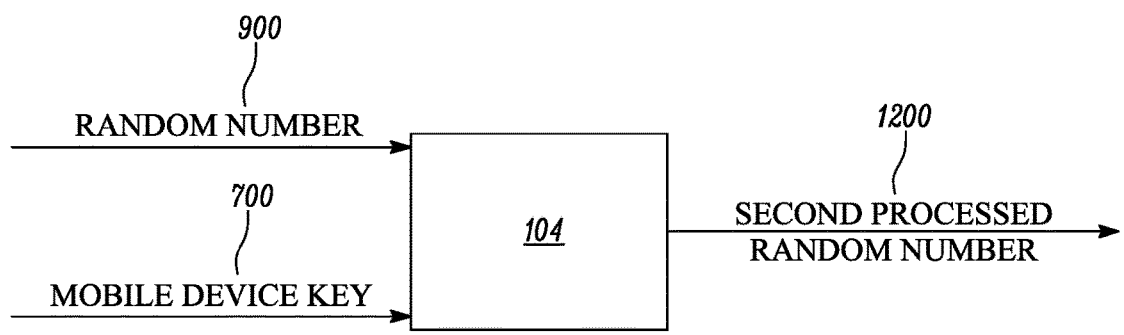
FIG. 12 shows a second processed random number being determined by the controller based on various inputs, according to an aspect of the present disclosure.

Referring to FIG. 9, the mobile device 108 then sends the FPRN 1100 to the controller 104. The controller 104 may receive the FPRN 1100 through the transceiver 214. The controller 104 also processes the random number 900 as shown in FIG. 12. The controller 104 makes use of the determined mobile device key 700 to process the random number 900. The controller 104 processes the random number 900 to derive a second processed random number (SPRN) 1200. The SPRN 1200 is an outcome of the determined mobile device key 700 being used to encrypt the random number 900 by the controller 104.

Figure 13:
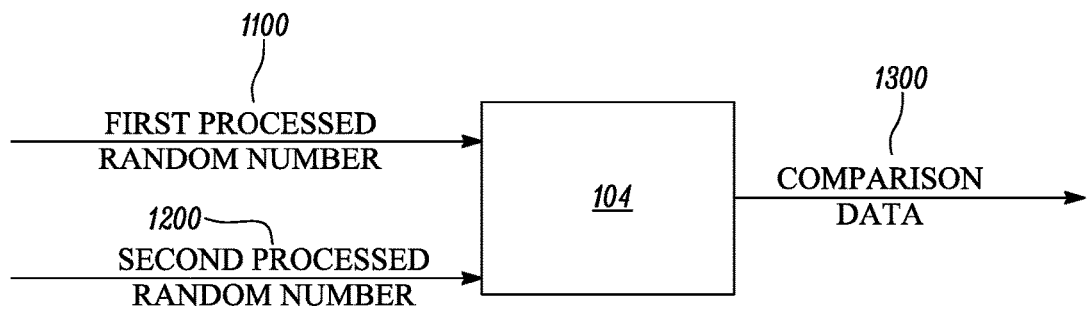
FIG. 13 shows a comparison data being determined by the controller based on various inputs, according to an aspect of the present disclosure.

The controller 104 compares the FPRN 1100 and the SPRN 1200 as shown in FIG. 13. Both the FPRN 1100 and the SPRN 1200 essentially represent the random number 900 processed by the mobile device key 700, the only difference being that the FPRN 1100 is processed by the mobile device 108, and the SPRN 1200 is processed by the controller 104. The controller 104 determines a comparison data 1300 from the comparison of the FPRN 1100 and the SPRN 1200.

Figure 14:
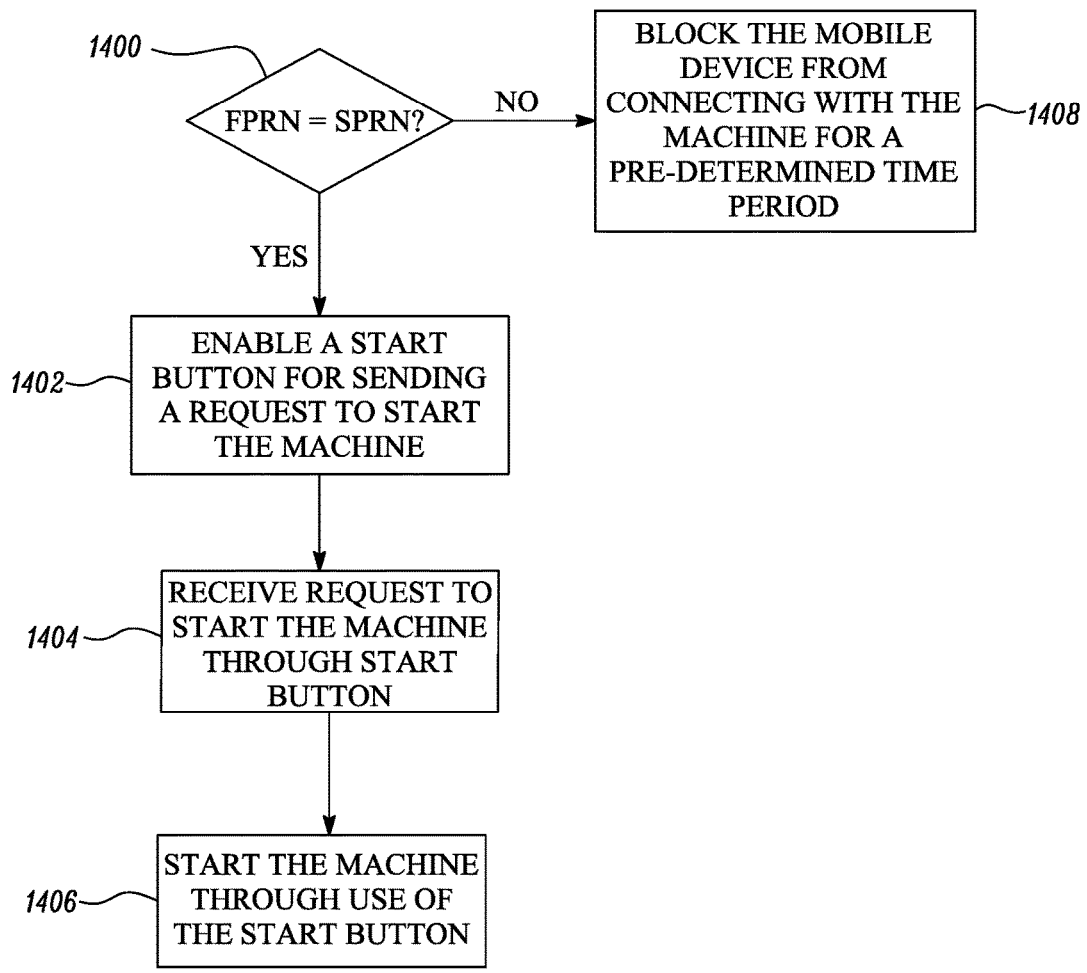
FIG. 14 shows steps taken after comparison data is determined, according to an aspect of the present disclosure.

Referring to FIG. 9, the controller 104 now sends an authentication response message 902 to the mobile device 108 after the comparison. The authentication response message 902 may include information about results of the comparison between the FPRN 1100 and the SPRN 1200. FIG. 14 illustrates further steps after comparison data 1300 is determined. In block 1400, the controller 104 compares the FPRN 1100 and the SPRN 1200 to check if the FPRN 1100 matches the SPRN 1200.

Figure 15:
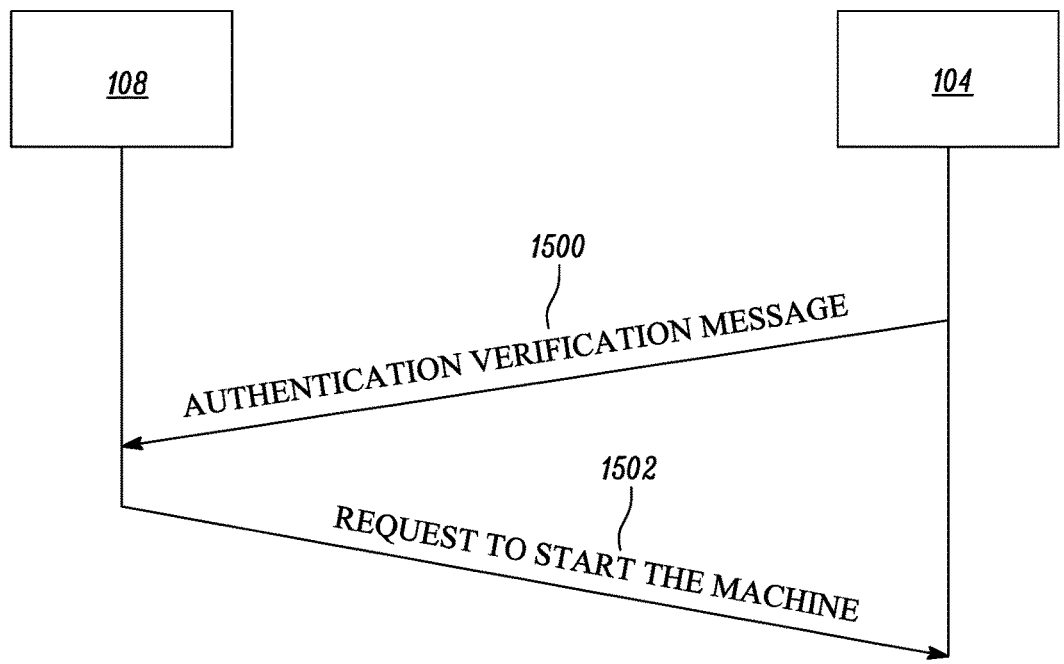
FIG. 15 shows communication between the mobile device and the controller, according to an aspect of the present disclosure.

In block 1402, when the FPRN 1100 matches the SPRN 1200, the controller 104 may send an authentication verification message 1500 to the mobile device 108, stating that the mobile device 108 is now authenticated and subsequently, enables the start button on the mobile device 108 and may be on the user interface 216 of the machine 100. The operator 106 uses the start button either on the mobile device 108 or the user interface 216 on the machine 100 to send a request 1502, as shown in FIG. 15 to the controller 104 to start the machine 100. In block 1404, the controller 104 may receive the request 1502 to start the machine 100 through the use of the start button. Subsequently, in block 1406, the controller 104 starts the machine 100 after receiving the request 1502.

When the FPRN 1100 and the SPRN 1200 do not match, then as shown in block 1408, the controller 104 blocks the mobile device 108 from connecting with the machine 100 for a pre-determined time period. In an embodiment, the pre-determine time period may be one minute. The pre-determined time period may be adjustable based on response frequency of the mobile device 108 and the controller 104.

INDUSTRIAL APPLICABILITY

Figure 16A:
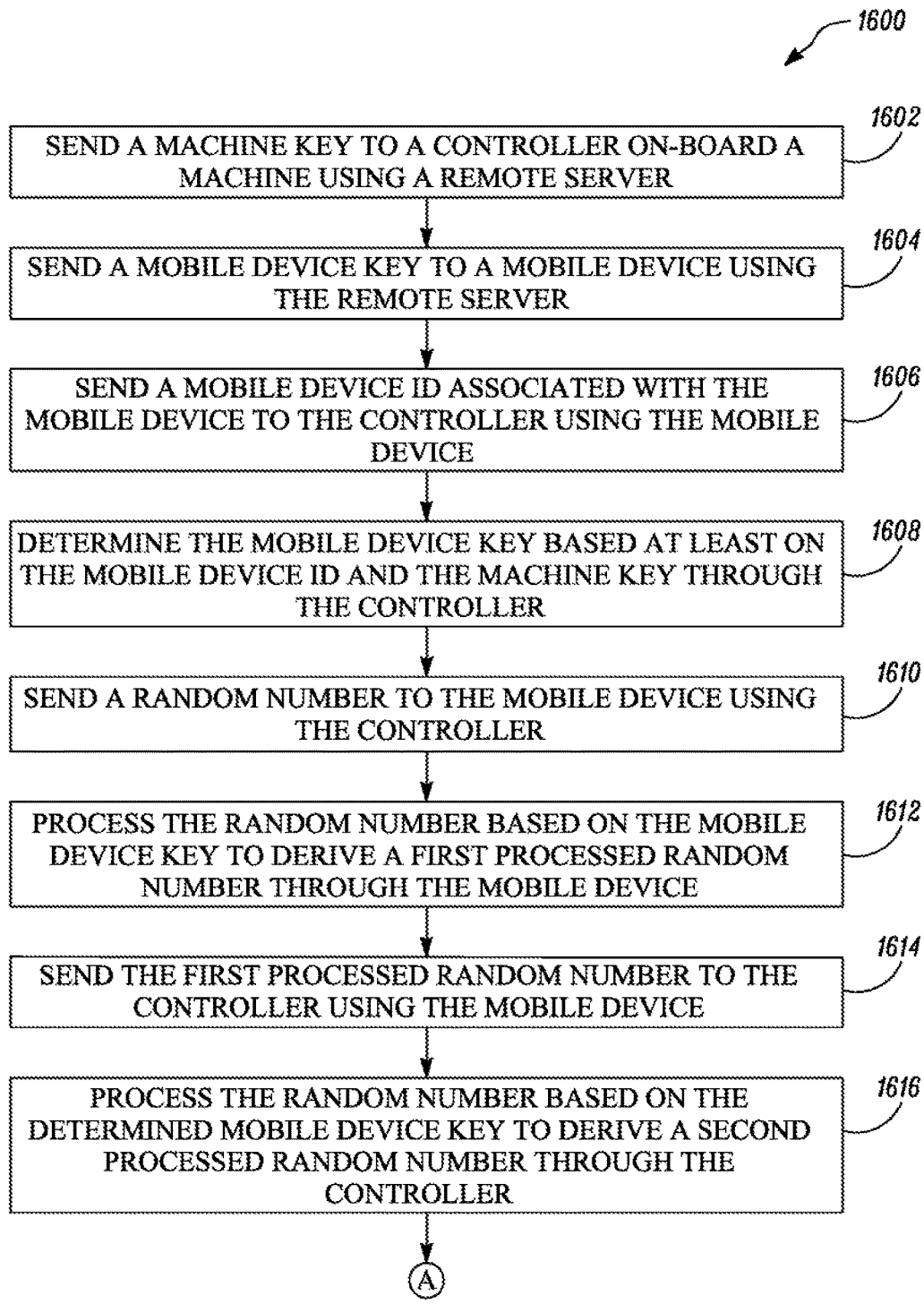
FIG. 16 shows a flow chart of a method to start the machine through the mobile device, according to an aspect of the present disclosure.
Figure 16B:
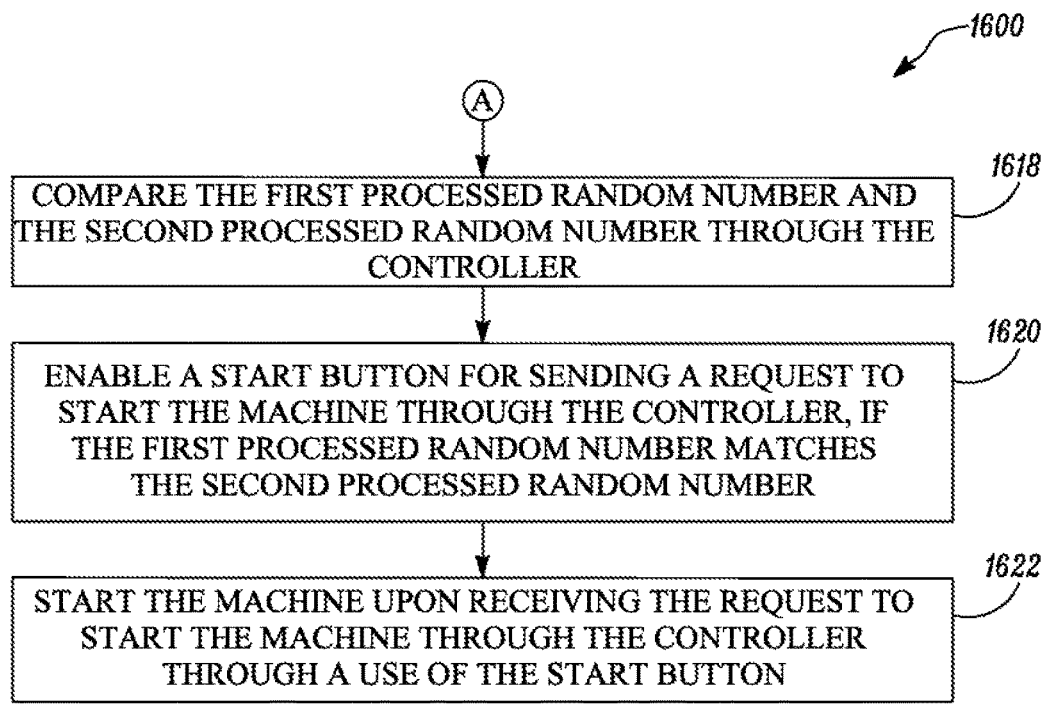

The present disclosure provides an improved method 1600 to start the machine 100 through the mobile device 108 as shown in FIG. 16. In block 1602, the remote server 202 sends the machine key 400 to the controller 104. The machine key 400 may be an encryption key. The remote server 202 may derive the machine key 400 based on the machine ID 219, the first key 402, and the first fixed random data 404. Any conventional random data generation algorithm, which may be suitable for application with various aspects of the present disclosure, may generate the first fixed random data 404.

In block 1604, the remote server 202 sends the mobile device key 700 to the mobile device 108. The mobile device key 700 may be an encryption key. The remote server 202 may derive the mobile device key 700 from the machine key 400, the mobile device ID 209, and the second fixed random data 702. Any conventional random data generation algorithm, which may be suitable for application with various aspects of the present disclosure, may be used to generate the second fixed random data 702. In block 1606, the mobile device 108 sends the mobile device ID 209 associated with the mobile device 108 to the controller 104. The controller 104 may receive the mobile device ID 209 through the transceiver 214.

In block 1608, the controller 104 determines the mobile device key 700 based at least on the mobile device ID 209 and the machine key 400. In an embodiment, the controller 104 determines the mobile device key 700 based on the machine key 400, the mobile device ID 209, and the second fixed random data 702. In block 1610, the controller 104 sends the random number 900 to the mobile device 108. The controller 104 may use any suitable random data generation algorithm, which may be suitable for application with various aspects of the present disclosure, to generate the random number 900.

In block 1612, the mobile device 108 processes the random number 900 by using the mobile device key 700 to derive the FPRN 1100. In block 1614, the mobile device 108 sends the FPRN 1100 to the controller 104. In block 1616, the controller 104 processes the random number 900 based on the determined mobile device key 700 to derive the SPRN 1200. The controller 104 may process the random number 900 through the processor 212 which may be configured to perform such calculations.

In block 1618, the controller 104 compares the FPRN 1100 and the SPRN 1200. In block 1620, the controller 104 enables the start button to send the request 1502 to start the machine 100, when the FPRN 1100 matches the SPRN 1200. The start button may be on the interface 216 of the machine 100 or the start button may be on the user interface 208 of the mobile application installed in the mobile device 108. In block 1622, the controller 104 starts the machine 100 upon receiving the request 1502 to start the machine 100, using the start button. The controller 104 may receive the request 1502 to start the machine 100 through the mobile device 108 or the operator 106 which may be present inside the machine 100. The mobile device 108 may send the request 1502 to start the machine 100 through the start button on the user interface 208 of the mobile application which gets enabled after the FPRN 1100 matches the SPRN 1200. The operator 106 may send the request 1502 to start the machine 100 by pressing the start button on the interface 216 of the machine 100 which gets enabled after the FPRN 1100 and the SPRN 1200 match.

The present disclosure makes use of encryption keys (the machine key 400 and the mobile device key 700) as well as random data (first fixed random data 404 and second fixed random data 702). Furthermore, the method 1600 includes the controller 104 sending the random number 900 to the mobile device 108, and the further steps of the authentication process are based on processing of the random number 900. The random numbers 900 may be generated for each instance of starting the machine 100, so there is an additional level of security added to the authentication process allowing a more secure way of starting the machine 100 through the mobile device 108. Furthermore, as the remote server 202 communicates with the controller 104 and the mobile device 108, it facilitates easily providing access to a new operator, or revoking or changing access to an already authorized operator.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method to start a machine through a mobile device, the method comprising:
    sending, using a remote server, a machine key to a controller on-board the machine, wherein the remote server is at an off-board location relative to the machine;
    sending, using the remote server, a mobile device key to the mobile device;
    sending, using the mobile device, a mobile device ID associated with the mobile device to the controller;
    determining, through the controller, the mobile device key based at least on the mobile device ID and the machine key;
    sending, using the controller, a random number to the mobile device;
    processing, through the mobile device, the random number based on the mobile device key to derive a first processed random number;
    sending, using the mobile device, the first processed random number to the controller;
    processing, through the controller, the random number based on the determined mobile device key to derive a second processed random number;
    comparing, through the controller, the first processed random number and the second processed random number;
    enabling, through the controller, a start button for sending a request to start the machine, when the first processed random number matches the second processed random number; and
    starting the machine, through the controller, upon receiving the request to start the machine through a use of the start button.

2. The method of claim 1, wherein enabling the start button comprises enabling the start button on at least one of the mobile device or on an interface present on-board the machine.

3. The method of claim 1, further comprising:
    blocking the mobile device, through the controller, from connecting with the machine for a pre-determined time period, when the first processed random number does not match the second processed random number.

4. The method of claim 1, wherein the remote server derives the machine key based on a machine ID, a first key, and a first fixed random data.

5. The method of claim 4, wherein the machine key comprises an encryption key.

6. The method of claim 1, wherein the remote server derives the mobile device key based on the machine key, the mobile device ID, and a second fixed random data.

7. The method of claim 5, wherein the mobile device key comprises an encryption key.

8. The method of claim 1, further comprising:
comparing, by the controller, the mobile device ID from a plurality of pre-stored mobile device IDs; and
sending, by the controller, the random number to the mobile device, when the mobile device ID matches one of the pre-stored mobile device IDs.

9. A control system to start a machine, the control system comprising:
a remote server located at an off-board location relative to the machine, wherein the remote server is configured to:
generate a mobile device ID;
generate a mobile device key; and
generate a machine key;
a mobile device configured to:
receive the mobile device ID from the remote server; and
receive the mobile device key from the remote server;
a controller on-board the machine, wherein the controller is configured to:
receive the mobile device ID from the mobile device;
receive the machine key from the remote server;
determine the mobile device key based on the mobile device ID and the machine key;
send a random number to the mobile device;
receive a first processed random number from the mobile device, wherein the mobile device determines the first processed random number based on the mobile device key;
process the random number based on the determined mobile device key to determine a second processed random number;
compare the first processed random number with the second processed random number;
enable a start button for sending a request to start the machine, when the first processed random number matches the second processed random number; and
start the machine, upon receiving the request to start the machine through a use of the start button.

10. The control system of claim 9, wherein enabling the start button comprises enabling the start button on at least one of the mobile device or on an interface present on-board the machine.

11. The control system of claim 9, wherein the controller is further configured to:
block the mobile device from connecting with the machine for a pre-determined time period, when the first processed random number does not match the second processed random number.

12. The control system of claim 9, wherein the remote server derives the machine key based on a machine ID, a first key, and a first fixed random data.

13. The control system of claim 12, wherein the machine key comprises an encryption key.

14. The control system of claim 9, wherein the remote server derives the mobile device key based on the machine key, the mobile device ID, and a second fixed random data.

15. The control system of claim 14, wherein the mobile device key comprises an encryption key.

16. The control system of claim 9, wherein the controller is further configured to:
compare the mobile device ID from a plurality of pre-stored mobile device IDs; and
send the random number to the mobile device, when the mobile device ID matches one of the pre-stored mobile device IDs.

17. A machine comprising:
a controller on-board the machine, wherein the controller is configured to:
receive a mobile device ID from a mobile device;
receive a machine key from a remote server;
determine a mobile device key based on the mobile device ID and the machine key;
send a random number to the mobile device;
receive a first processed random number from the mobile device, wherein the mobile device determines the first processed random number based on the mobile device key received from the remote server;
process the random number based on the determined mobile device key to determine a second processed random number;
compare the first processed random number with the second processed random number;
enable a start button for sending a request to start the machine, when the first processed random number matches the second processed random number; and
start the machine, upon receiving the request to start the machine through a use of the start button.

18. The machine of claim 17, wherein enabling the start button comprises enabling the start button on at least one of the mobile device or on an interface present on-board the machine.

19. The machine of claim 17, wherein the controller is further configured to:
block the mobile device from connecting with the machine for a pre-determined time period, when the first processed random number does not match the second processed random number.

20. The machine of claim 17, wherein the controller is further configured to:
compare the mobile device ID from a plurality of pre-stored mobile device IDs; and
send the random number to the mobile device, when the mobile device ID matches one of the pre-stored mobile device IDs.

* * * * *